United States Patent
Ehret et al.

(10) Patent No.: US 12,202,927 B2
(45) Date of Patent: Jan. 21, 2025

(54) MASS FIXABLE BY ACTINIC RADIATION, AND USE OF SAID MASS

(71) Applicant: DELO Industrie Klebstoffe GmbH & Co. KGaA, Windach (DE)

(72) Inventors: Markus Ehret, Windach (DE); Andreas Henschel, Windach (DE)

(73) Assignee: DELO Industrie Klebstoffe GmbH & Co. KGaA, Windach (DE)

( * ) Notice: Subject to any disclaimer, the term of this patent is extended or adjusted under 35 U.S.C. 154(b) by 1146 days.

(21) Appl. No.: 16/967,629

(22) PCT Filed: Jan. 30, 2019

(86) PCT No.: PCT/EP2019/052174
§ 371 (c)(1),
(2) Date: Jun. 3, 2021

(87) PCT Pub. No.: WO2019/154676
PCT Pub. Date: Aug. 15, 2019

(65) Prior Publication Data
US 2022/0213254 A1   Jul. 7, 2022

(30) Foreign Application Priority Data
Feb. 9, 2018   (DE) .............. 10 2018 102 916.0

(51) Int. Cl.
| | |
|---|---|
| *C08G 18/69* | (2006.01) |
| *C08G 18/24* | (2006.01) |
| *C08G 18/48* | (2006.01) |
| *C08G 18/50* | (2006.01) |
| *C08G 18/62* | (2006.01) |
| *C08G 18/79* | (2006.01) |
| *C08G 18/80* | (2006.01) |
| *C09D 4/00* | (2006.01) |
| *C09J 4/00* | (2006.01) |
| *C09J 5/06* | (2006.01) |

(52) U.S. Cl.
CPC ....... *C08G 18/4812* (2013.01); *C08G 18/242* (2013.01); *C08G 18/5027* (2013.01); *C08G 18/6204* (2013.01); *C08G 18/69* (2013.01); *C08G 18/798* (2013.01); *C08G 18/8006* (2013.01); *C09D 4/00* (2013.01); *C09J 4/00* (2013.01); *C09J 5/06* (2013.01); *C09J 2475/00* (2013.01)

(58) Field of Classification Search
CPC .............. C08G 18/4812; C08G 18/242; C08G 18/5027; C08G 18/6204; C08G 18/69; C08G 18/798; C08G 18/8006; C09D 4/00; C09J 4/00; C09J 5/06; C09J 2475/00
See application file for complete search history.

(56) References Cited

U.S. PATENT DOCUMENTS

| | | | |
|---|---|---|---|
| 7,297,723 B2 | 11/2007 | Wilke et al. | |
| 10,023,684 B2 | 7/2018 | Nienhaus et al. | |
| 2002/0193534 A1* | 12/2002 | Abend | C08G 18/8058 525/452 |
| 2003/0078315 A1* | 4/2003 | Bradford | C09D 175/16 524/589 |
| 2003/0119976 A1 | 6/2003 | Ganster et al. | |
| 2004/0048977 A1 | 3/2004 | Wilke et al. | |
| 2010/0216945 A1 | 8/2010 | Nienhaus et al. | |

FOREIGN PATENT DOCUMENTS

| | | |
|---|---|---|
| DE | 10115605 A1 | 10/2002 |
| DE | 102004057916 A1 | 6/2006 |
| DE | 102007031594 A1 | 1/2009 |

OTHER PUBLICATIONS

International Search Report for PCT/EP2019/052174 dated Apr. 11, 2019.

* cited by examiner

*Primary Examiner* — Robert S Jones, Jr.
*Assistant Examiner* — Jiangtian Xu
(74) *Attorney, Agent, or Firm* — McNees Wallace & Nurick LLC

(57) ABSTRACT

The invention relates to isocyanate-based, storage-stable, one-part compositions that are fixable by irradiation with actinic radiation and curable by heat. The composition comprises (A) an at least bifunctional, solid isocyanate having a passivated surface and a melting point of at least 40° C.; (B) an isocyanate-reactive component selected from the group of alcohols, amines and thiols, and mixtures thereof; (C) a radiation-curable compound; and (D) a photoinitiator. Optionally, further additives (E) can be contained in the composition according to the present invention. The compositions, by fixation with actinic radiation, can be transferred into a state that ensures dimensional stability of the compositions during heat curing.

20 Claims, No Drawings

MASS FIXABLE BY ACTINIC RADIATION, AND USE OF SAID MASS

FIELD OF THE INVENTION

The present invention refers to storage-stable, actinic radiation-fixable and heat-curable isocyanate-based one-part compositions.

In addition, the invention relates to a method of joining, coating and casting of substrates using the composition.

BACKGROUND OF THE INVENTION

In the field of electronics, the individual parts tend to be increasingly miniaturized resulting in bonding, casting and coating having to be performed very precisely. Moreover, adhesives used for electronics applications have to meet many other requirements. For example, in the field of microelectro-mechanical systems (MEMS) compositions are required which are highly flexible even at low temperatures of down to −40° C. This is the only way that the desired mechanical decoupling of the MEMS part from the substrate by means of the adhesive can be successful. Without sufficient decoupling, no satisfying signal qualities are achievable, which is particularly disadvantageous for sensor and microphone applications.

Silicone-based compositions are an established solution. They possess high thermal stability and high flexibility at low temperatures. In some technical applications, however, silicone materials are undesired as soldering and varnishing processes could be interfered with by cyclic siloxane impurities. Further, as silicones have a high spreading ability, silicones in miniaturized structures can be processed only with difficulty, requiring substantial technical effort to restrict spreading of the silicones onto the desired surface.

In the state of the art, there exist many chemical alternatives to silicones such as polyurethane compositions, whose flexibility can be well adjusted. One-part, heat-curing compositions are accessible by using solid, surface-passivated isocyanates. Superficial encapsulation of solid isocyanates can be achieved, for example, by reacting the isocyanates with amines. This allows isocyanate-containing compounds to be transferred into a form in which they remain stable to oxygen or nitrogen nucleophiles at room temperature for a certain period of time. This principle is used in reactive hot melt adhesives or in one-part polyurethane dispersion adhesives.

EP 0 100 508 B1 discloses a method of manufacturing one-part, storage-stable and heat-curable compositions comprising a surface-passivated polyisocyanate and at least one isocyanate group-reactive curing agent that can be selected from the group of compounds containing amine, hydrazide or thiol groups. The described compositions are storage-stable at room temperature for a period of at least 3 months.

EP 0 153 579 B1 describes the use of heat-curing, one-part polyurethane urea compositions. The compositions contain fine particle polyisocyanates with a melting point of >40° C. that were passivated at their surface by reaction with polyamines, hydrazine, alkyl hydrazines, hydrazides, amidines and/or guanidines.

However, when heated, the known compositions tend to melt away. Fixing of the compositions in their shape prior to heat curing, also under the weight of a part, is not possible.

From EP 1 082 399 B1 latent reactive hot melt adhesives are known which contain at least one solid surface-passivated polyisocyanate, an isocyanate-reactive polymer and an additive that can be selected from the group of desiccants.

EP 1 386 936 A1 describes a method of manufacturing a reactive hot melt adhesive in which the isocyanate-reactive component itself is a reaction product of an isocyanate-containing compound with monomers or prepolymers containing hydroxyl or amino groups. Naturally, the hot melt adhesives are present in solid form at room temperature and cannot be dosed directly.

EP 1 681 324 A2 describes so-called "dual cure" systems containing a blocked isocyanate as a crosslinker and a radically polymerizable compound. The blocked isocyanates have the disadvantage that the blocking agent has to be split off to achieve heat curing of the systems. The split-off blocking agent can diffuse out of the composition and thus cause environmentally harmful and unhealthy outgassing.

DE 10 048 849, EP 0 928 800 and DE 19 818 735 each describes multi-component compositions of isocyanate-reactive compounds, isocyanates and actinic radiation-curable compounds which are mixed for reaction with each other shortly before processing the compositions. Reaction is performed in the presence of catalysts such as tin-containing metal catalysts. Although the described compositions can be fixed by radiation in the presence of a photoinitiator, they have only short open times and cannot be formulated as a storage-stable one-part composition.

Thus, there is still the need for one-part compositions dosable at room temperature, in particular for the joining, coating and casting of electronic parts, which, apart from high flexibility of the cured compositions, also offer the possibility of being fixed prior to the curing step in order that the shape and position of the adhesive and the join partners can be precisely adjusted.

SUMMARY OF THE INVENTION

The object of the invention is to avoid the disadvantages of the compositions known from the state of the art and to provide one-part compositions liquid at room temperature while being storage-stable which are heat-curing and additionally fixable by actinic radiation. Flexibility of the cured compositions should be freely adjustable over a wide range.

According to the present invention, this object is solved by a one-part curable composition according to claim 1. Advantageous embodiments are indicated in the subclaims, which can optionally be combined with each other.

The composition according to the present invention comprises (A) an at least bifunctional solid isocyanate having a passivated surface and a melting point of at least 40° C.; (B) an isocyanate-reactive component selected from the group of alcohols, amines and thiols, and mixtures thereof; (C) a radiation-curable compound having at least one radically polymerizable group; and (D) a photoinitiator for radical polymerization. Optionally, the composition according to the present invention can contain further additives (E).

The composition is liquid at room temperature and characterized by a high variability of the components used for the formulation combined with the possibility of light fixation. For example, by selecting alcohols as the isocyanate-reactive component, polyurethane networks can be formed in the cured product. When using amines as a curing agent, urea networks can be created. By selecting thiols, thiourethane networks are obtainable. Thus, the high variability of the formulation allows the user to achieve a broad range of properties in the cured compositions according to the present invention.

The major advantage over the state of the art is that the compositions are fixable by actinic radiation, can be formulated as a single component and, at the same time, have a good storage stability at room temperature.

Compositions intended for applications in microelectromechanical systems (MEMS) preferably have a glass transition temperature of −20° C. or less.

In addition, the invention relates to a method of joining, coating and casting of substrates using the composition according to the present invention. The composition can be transferred into a dimensionally stable state, in particular a so-called B stage state, by irradiation and, temporally decoupled from irradiation, finally heat-cured in subsequent process steps.

DETAILED DESCRIPTION OF THE INVENTION

In the following, the invention will be described in detail and by way of example on the basis of preferred embodiments, which, however, are not to be construed as limiting. The following definitions are used in the description:

"One-part" or "one-part composition", in accordance with the invention, means that the components mentioned are jointly present in a common formulation, i. e. are not stored separately from each other.

Here and in the following, "storage-stable" means that the viscosity of the composition does not increase by more than 100% when stored at room temperature for a period of 7 days. Preferably, the increase in viscosity over a period of 14 days is not more than 100%.

"Liquid", in accordance with the invention, means that, at room temperature, the loss modulus G", determined by rheological measurement, is larger than the storage modulus G' of the respective composition.

"At least bifunctional" or "polyfunctional" means that the respective compound or mixture of substances has a functionality of at least 2, relative to a certain functional group. Thus, at least bifunctional or polyfunctional isocyanates have at least two isocyanate groups (—NCO) in their molecule.

As far as the indefinite article "a" or "an" is used, this also comprises the plural form "one or more", if not expressively excluded.

All weight proportions set out hereinafter refer to the total weight of the curable composition including the reactive components (A) to (D) and the non-reactive additives (E) such as fillers or plasticizers.

Component (A): At Least Bifunctional Solid Isocyanate

In general, every at least bifunctional isocyanate having a melting point of at least 40° C. can be used as a solid, at least bifunctional isocyanate (A). Preferably, the at least bifunctional isocyanate has a melting point of at least 60° C.

The isocyanate is preferably an aliphatic, cycloaliphatic, heterocyclic or aromatic polyisocyanate. Examples of suitable polyisocyanates are: dimeric 2,4-diisocyanatotoluene, dimeric 4,4'-diisocyanatodiphenylmethane, 3,3'-diisocyanato-4,4'-dimethyl-N,N'-diphenylurea, the isocyanurate of isophorone diisocyanate, 1,4-phenylene diisocyanate, naphthalene-1,5-diisocyanate and addition products of diisocyanates with short-chain diols such as 1,4-butanediol or 1,2-ethanediol. Dimeric 2,4-diisocyanatotoluene, dimeric 4,4'-diisocyanatodiphenylmethane, 3,3'-diisocyanato-4,4'-dimethyl-N,N'-diphenylurea and/or the isocyanurate of isophorone diisocyanate are preferred.

The isocyanates can be used alone or in a mixture of two or more of the polyisocyanates.

To provide storage-stable compositions, the solid polyisocyanate is passivated at its surface to prevent an immediate reaction of the solid isocyanate with the isocyanate-reactive component (B) present in the one-part composition.

For passivation, the surface of the solid isocyanate can be covered with an inert layer of particles, for example of nanoscale titanium dioxide, as described in DE 60 126 313 T2. However, the solid polyisocyanate is preferably reacted at its surface with a passivation agent as described, for example, in EP 0 153 579 A2 or EP 0 100 508 B1, which are incorporated in the description by reference.

By reacting the solid polyisocyanate with a passivation agent a substantially inert shell is formed at its surface which prevents further reaction of the isocyanate groups beneath the shell until, by supply of heat, the shell is broken and the one-part composition cures.

Preferred passivation agents are compounds from the group of polyamines, amidine and/or guanidine compounds, hydrazine, alkyl hydrazines and/or hydrazide compounds reacting with the isocyanate groups located at the surface of the solid polyisocyanate to form urea groups.

Primary, aliphatic, at least bifunctional amines with a molecular weight of 60-600 g/mol are especially preferred as a passivation agent, and polyether amines, as commercially available, for example, under the designation Jeffamine® D-400 or Jeffamine® T-403 by Huntsman Corporation, are particularly preferred.

For passivation, preferably 0.1-25 mol % of all isocyanate groups present in the solid polyisocyanate is reacted with the passivation agent, more preferably 0.5-15 mol % and particularly preferably 1-10 mol %. The reaction preferably takes place with the formation of urea groups. It is particularly preferred that the solid polyisocyanate present in the form of micronized particles is reacted with the passivation agent at a temperature below the melting point of the solid polyisocyanate in a liquid medium which itself is not a good solvent for the polyisocyanate. In particular higher-molecular weight polyols or polyamines with a molecular weight of up to 6000 g/mol, which themselves can be used as the isocyanate-reactive component in the compositions according to the present invention, can serve as the liquid medium.

The surface-passivated, solid polyisocyanate, according to a preferred embodiment, is present in the form of fine particles. Thereby, a homogeneously cured composition can be obtained when supplying heat. Preferably, the solid polyisocyanate is present in the form of particles with a mean particle diameter (numerical) of at most 100 µm, preferably at most 40 µm and particularly preferably at most 10 µm.

By selecting different polyisocyanates and the related curing agent systems, both hard and very soft systems showing an almost unchanged course of the elastic modulus across a large temperature range can be formulated with the compositions according to the present invention.

The proportion of the surface-passivated, at least bifunctional isocyanate in the composition according to the present invention is preferably about 5 to 40 weight percent.

Component (B): Isocyanate-Reactive Component

Apart from component (A), the compositions according to the present invention contain, as component (B), at least one isocyanate-reactive component selected from the group of alcohols, amines and thiols, and mixtures thereof. When heating the composition, component (B) reacts with the polyisocyanate (A) to form a network and the composition cures.

Component (B) is preferably liquid and not further restricted in terms of its chemical constitution. Preferably, component (B) carries isocyanate-reactive groups with a mean functionality of larger than 1. Particularly preferably, polyols, polyamines and/or polythiols with a functionality of at least 2 are used as isocyanate-reactive compounds. Mixtures of different isocyanate-reactive compounds are also in accordance with the invention.

The mean functionality of component (B) and thus the crosslinking density can be adjusted almost arbitrarily by combining monofunctional, di- and higher-functional isocyanate-reactive compounds, as long as a polymeric network is formed by the addition reaction with the at least bifunctional isocyanate (A) when supplying heat. Preferably, the mean functionality is at least 1.4 and particularly preferably at least 1.7, but preferably not larger than 5 and particularly preferably not larger than 4.

The cured compositions can be specifically formed to exhibit hard and soft segments. To form hard segments, isocyanate-reactive components (B) with a molecular weight of up to about 400 g/mol are preferably used as so-called chain extenders forming a high density of linking groups such as (thio)urethane or urea groups with the at least bifunctional isocyanate, which are then linked with each other by a dense network of hydrogen bridges. To form soft segments, component (B) preferably comprises long-chain isocyanate-reactive compounds with a molecular weight of about 400 g/mol to about 20,000 g/mol.

The isocyanate-reactive compounds can already be pre-extended with liquid, non-passivated isocyanates, forming prepolymers.

In isocyanate-containing systems, water can compete with the isocyanate-reactive groups and lead to an undesired bubble formation. Thus, component (B) preferably comprises or consists of a hydrophobic isocyanate-reactive compound.

Preferably, component (B) comprises a polyol, particularly preferably a long-chain polyol with a mean molecular weight $M_n$ from 400 to 20,000 g/mol. Examples of suitable long-chain polyols are polyether-based polyols, commercially available as Acclaim® types, polyesters and polycarbonates, available as Kuraray® or Priplast™ types, and additionally polyols based on polybutadienes and hydrogenated polybutadienes, available as Krasol®, Polyvest® or Nisso-PB® types.

Long-chain polyols with a mean molecular weight from 2000 to 20,000 g/mol are particularly suitable for the manufacture of compositions showing high flexibility at low temperatures and a low glass transition temperature after curing.

As a chain extender, component (B) can comprise at least one low-molecular weight polyol with a molecular weight of up to 400 g/mol, such as glycol, glycerol, 1,4-butanediol or 2-ethyl-1,3-hexanediol.

Polyether amines with a molecular weight of 600 g/mol or larger, as available, for example, as Jeffamin® D-2000 or Jeffamin® T-5000, can be used as an amine in component (B). Also preferred are higher-molecular weight aromatic amines with a mean molecular weight from 400 g/mol to 12,000 g/mol, which can be obtained, according to EP 0 071 834 A1, by alkaline hydrolysis of compounds with terminal isocyanate groups, in particular isocyanate prepolymers. Suitable aromatic diamines are commercially available under the designation Versalink® P-650 and Versalink® P-1000. In addition, aromatic diamines such as diethyltoluenediamine can be used as chain extenders.

For example, ester-based thiols such as trimethylolpropane-tris-(3-mercaptopropionate) or pentaerythritol-tetrakis-(3-mercaptobutylate) are suitable for use in component (B). In addition, thiol group-terminated polyethers can be used as the isocyanate-reactive component, as well as polythioethers carrying thiol groups or tris-(3-mercaptopropyl)-isocyanurate.

In the composition according to the present invention, the isocyanate-reactive component (B) is preferably present in a proportion of 2 to 85 weight percent, more preferably in a proportion of 40 to 85 weight percent. The proportions can vary across a wide range depending on the functionality and the molecular weight of the isocyanate-reactive component.

Component (C): Radiation-Curable Compound

In addition to components (A) and (B), the composition according to the present invention comprises at least one radiation-curable compound (C). The radiation-curable compound (C) serves to ensure light fixability of the composition.

The radiation-curable compound (C) carries at least one radically polymerizable group and optionally at least one isocyanate-reactive group. Thus, both compounds (C1), which, apart from at least one radically polymerizable group, exhibit no isocyanate-reactive group in the molecule, and compounds (C2), which, apart from at least one radically polymerizable group, additionally exhibit at least one isocyanate-reactive group, can be used as component (C). By selecting a compound (C2), chemical crosslinking between the network formed from the radiation-curable compound by irradiation with actinic radiation and the network formed from components (A) and (B) by heat supply can be achieved.

The radically polymerizable group in compound (C) is preferably an alkene group, particularly preferably a terminal alkene group, particularly preferably a (meth)acrylate group. Here and in the following, the term "(meth)acrylate" designates the derivatives of acrylic acid and methacrylic acid. Otherwise, the radiation-curable compound (C) is not further restricted in terms of its chemical basic structure and can, for example, be an aromatic, aliphatic or cycloaliphatic compound.

In the presence of thiols, radical polymerization can also use a thiol-ene mechanism.

The following compounds can be cited as an example of radiation-curable compounds (C1) carrying at least one radically polymerizable group and no isocyanate-reactive group: isobornyl acrylate, stearyl acrylate, tetrahydrofurfuryl acrylate, cyclohexyl acrylate, 3,3,5-trimethylcyclohexanol acrylate, behenyl acrylate, 2-methoxyethyl acrylate and other single- or multi-alkoxylated alkyl acrylates, isobutyl acrylate, isooctyl acrylate, lauryl acrylate, tridecyl acrylate, isostearyl acrylate, 2-(o-phenylphenoxy)ethyl acrylate, acryloylmorpholine, N,N-dimethylacrylamide, 4-butanediol diacrylate, 1,6-hexanediol diacrylate, 1,10-decanediol diacrylate, tricyclodecanedimethanol diacrylate, dipropyleneglycol diacrylate, tripropyleneglycol diacrylate, polybutadiene diacrylate, cyclohexanedimethanol diacrylate, diurethane acrylates of monomeric, oligomeric or polymeric diols and polyols, trimethylolpropane triacrylate (TMPTA) and dipentaerythritol hexaacrylate (DPHA). Higher-functional acrylates derived from multi-branched or dendrimeric alcohols can also be used advantageously.

The analogous methacrylates of the above-mentioned compounds are also in accordance with the invention.

Further, compounds with allyl groups, as they are present, for example, in 1,3,5-tri-2-propenyl-1,3,5-triazin-2,4,6(1H, 3H,5H)-trione (triallyl isocyanurate), commercially available under the designation TAICROS®, are suitable. The unsaturated non-hydrogenated polybutadienes such as the Poly BD® types can also be used as the radiation-curing component (C). Further, the use of vinyl ethers and unsaturated polyester resins is possible.

As radiation-curable compounds (C2), which, apart from the radically polymerizable group, additionally carry an isocyanate-reactive group, the following can be used: 2-hydroxyethyl(meth)acrylate, 4-hydroxybutyl(meth)acrylate, 2-hydroxy-3-phenoxypropyl(meth)acrylate, 2-hydroxypropyl(meth)acrylate, polycaprolactone (meth)acrylate, pentaerythritol-tri(meth)acrylate and dipentaerythritolpenta(meth)acrylate (DIPEPA). Hydroxy group-terminated polybutadienes are also suitable as the radiation-curing and isocyanate-reactive compound (C2).

The above-mentioned radiation-curable compounds can be used alone or mixed with each other. Mixtures of compounds (C1) and (C2) are also in accordance with the invention.

As far as a radiation-curable compound (C2) which additionally carries isocyanate-reactive groups is used, it simultaneously fulfils the function of the isocyanate-reactive component (B). According to an embodiment of the composition according to the present invention, the radiation-curable compound (C2) carrying the isocyanate-reactive groups can completely or partially replace the isocyanate-reactive component (B).

Moreover, the number and density of radically polymerizable groups influence the flexibility of the composition fixed by actinic radiation. Preferably, the radiation-curable compound (C) has a mean functionality of larger than 1 to contain a crosslinked composition having an improved dimensional stability. Particularly preferably, the mean functionality of the radiation-curable compound (C) relative to the radically polymerizable groups is 1.2 to 5, more preferably 1.2 to 4, even more preferably 1.2 to 3 and particularly preferably 1.5 to 2.5.

The proportion of the radiation-curing compound (C) in the curable composition is preferably 5 to 80 weight percent. Particularly preferably, the radiation-curable compound is a (meth)acrylate or an allyl compound and is present in the composition according to the present invention in a proportion of up to 50% by weight, particularly preferably in a proportion of 5 to 30% by weight.

Component (D): Photoinitiator

In addition to the radiation-curable compound (C), the compositions according to the present invention contain a photoinitiator (D) for radical polymerization. The photoinitiator is activated by irradiation with actinic radiation and thus triggers the polymerization of the radiation-curable compound (C).

As the photoinitiator (D), the usual, commercially available compounds can be used, such as α-hydroxy ketones, benzophenone, α,α'-diethoxy acetophenone, 4,4-diethylaminobenzophenone, 2,2-dimethoxy-2-phenylacetophenone, 4-isopropylphenyl-2-hydroxy-2-propyl ketone, 1-hydroxycyclohexyl phenyl ketone, isoamyl-p-dimethylaminobenzoate, methyl-4-dimethylaminobenzoate, methyl-o-benzoylbenzoate, benzoin, benzoin ethyl ether, benzoine isopropyl ether, benzoine isobutyl ether, 2-hydroxy-2-methyl-1-phenylpropane-1-one, 2-isopropyl-thioxanthone, dibenzosuberone, ethyl-(2,4,6-trimethylbenzoyl phenylphosphinate, monoacylphosphine oxides, phenyl-bis-(2,4,6-trimethylbenzoyl)-phosphine oxide and bisacylphosphine oxides, with the photoinitiators mentioned being able to be used alone or in combination of two or more of the compounds mentioned.

For example, the IRGACURE™ types by BASF SE can be used as photoinitiators, such as the IRGACURE 184, IRGACURE 500, IRGACURE 1179, IRGACURE 2959, IRGACURE 745, IRGACURE 651, IRGACURE 369, IRGACURE 907, IRGACURE 1300, IRGACURE 819, IRGACURE 819DW, IRGACURE 2022, IRGACURE 2100, IRGACURE 784, IRGACURE 250, IRGACURE TPO and IRGACURE TPO-L types. Moreover, the DAROCUR™ types by BASF SE can be used, for example the DAROCUR MBF, DAROCUR 1173, DAROCUR TPO and DAROCUR 4265 types.

The photoinitiator used in the compositions according to the present invention can preferably be activated by actinic radiation with a wavelength from 200 to 600 nm, particularly preferably 320 to 480 nm. As necessary, the photoinitiator (D) can be combined with a suitable sensitizing agent.

In the compositions according to the present invention, the photoinitiator (D) is preferably present in a proportion of 0.01 to 5% by weight, preferably in a proportion of at most 2% by weight, based on the total weight of the composition.

Component (E): Additives

Apart from components (A) to (D), the compositions according to the present invention can contain further additives (E). As non-limiting examples catalysts, toughness modifiers such as core-shell particles or block copolymers, dyes, pigments, fluorescent agents, thixotropic agents, thickeners, thermal stabilizers, stabilizers, antioxidants, plasticizers, fillers, flame retardants, corrosion inhibitors, water scavengers, dilution agents, levelling and wetting additives, adhesion promotors and combinations thereof can be named.

As catalysts, preferably compounds catalyzing the reaction of the isocyanate-reactive groups with the polyisocyanate that are known to those skilled in the art are used. Examples of suitable catalysts are in particular metal catalysts based on tin, zinc, lead, mercury or bismuth, or tertiary amines such as triethylene diamine or DBU. In addition, solid epoxy amine adducts, as used, for example, as latent curing agents for epoxy resins, can be used as catalysts in the compositions according to the present invention.

In general, inert organic solvents can be used as dilution agents as long as they do not dissolve the solid polyisocyanate. However, the composition is preferably free of inert organic solvents as the use of such solvents is adverse with regard to environmental aspects and thus not preferred. Although, in general, water can be used as a dispersant, this requires a cumbersome drying step in the processing of the composition; thus, the use of an aqueous dispersion is not preferred either.

In the curable composition, the additives are preferably present in a proportion of 0 to 80% by weight, preferably in a proportion of 0 to 50% by weight.

Composition of the Compositions According to the Present Invention

The composition according to the present invention preferably comprises or consists of the above-mentioned components (A) to (D) and at least one of the above-mentioned additives (E).

According to a first preferred embodiment, the composition according to the present invention comprises the following components:
- (A) a solid, at least bifunctional isocyanate having a melting point of at least 60° C. that is passivated at its surface by reaction of 0.5 to 15% of the isocyanate groups with polyamines, amidine and/or guanidine compounds, hydrazine, alkyl hydrazines and/or hydrazide compounds;
- (B) a polyol having a mean functionality of 1.4-3;
- (C) a radiation-curable compound having a radically polymerizable group and a mean functionality of 1.5 to 3;
- (D) a photoinitiator in a proportion of 0.01 to 2% by weight; and
- (E) a catalyst for heat curing, and optionally a thixotropic agent.

The water content of the curable composition is preferably kept as low as possible as water has a similarly high reactivity with isocyanate groups as the hydroxyl groups of the polyols used as the isocyanate-reactive component (B). Thus, an excessively high water content in the composition can lead to bubble formation. Adjustment of a low water content can be achieved by adding water scavengers such as vinyltrimethoxysilane, which can be added as further additives (E). Preferably, hydrophobic polyols such as hydroxy-terminated polybutadienes or hydrogenated hydroxy group-terminated polyolefins with an inherently low water content and low hygroscopy are used as the isocyanate-reactive component (B).

It is particularly preferred to use a mixture of two or more polyols as the isocyanate-reactive component (B), in particular a mixture of at least one low-molecular weight and one higher-molecular weight polyol. The hardness and flexibility of the composition according to the present invention can be easily adjusted by the equivalent weight of the polyols and their ratio to each other. The generation of hard and soft segments by selecting short- and long-chain polyols with different molecular weights is known to those skilled in the art of polyurethane chemistry. Especially high flexibility at low temperatures or a low glass transition temperature can be adjusted by adequate selection of the long-chain polyols. To this end, polyols having a molecular weight of from 2,000-20,000 g/mol which themselves have a low glass transition temperature, such as polyether- or polybutadiene-based polyols, are suitable.

It is further preferred that the polyol, as the isocyanate-reactive component (B), is used together with a heat curing catalyst. Metal-containing catalysts based on tin, zinc, lead, mercury or bismuth and/or catalysts based on tertiary amines such as DBU or triethylamine are well suited. Using dibutyl-tin dilaurate as a catalyst is particularly preferred. The catalyst promotes the reaction of the polyol with the isocyanate, forming a polyurethane network.

As the radiation-curable compound (C), urethane (meth)acrylates are preferably used as they radically polymerize quickly and are readily compatible with the polyols. At the same time, the compositions remain sufficiently flexible after irradiation with actinic radiation to allow joining of a second substrate and easy flow of the compositions onto the second substrate.

According to a second preferred embodiment, polythiols are used as the isocyanate-reactive component (B). Compared to alcohols, polythiols show a higher reactivity with isocyanate groups, in particular when catalyzed by bases. Thus, it is preferred to use tertiary amines such as triethylamine, DBU or epoxy-amine adducts as catalysts. Due to the high reactivity of the polyols, no additional measures are necessary to reduce the water content of the composition.

The thiols can not only be nucleophilically added to the isocyanate of component (A) but also react with the radiation-curing component (C) using a thiol-ene mechanism, thus further increasing the crosslinking density.

According to a third preferred embodiment polyamines are used as the isocyanate-reactive component (B). Polyamines have a high reactivity with isocyanate groups. Thus, polyamines can also be used without using a catalyst. In addition, no special measures to reduce the water content are necessary. Amines can also be added to acrylate groups in a by-reaction, possibly affecting the storage stability of the composition. Thus, when using polyamines as the isocyanate-reactive component (B), a compound with radically polymerizable methacrylate groups is preferably used as the radiation-curable compound (C).

In all described embodiments the molar ratio between the free, not yet passivated isocyanate groups in component (A) and the isocyanate-reactive groups in component (B) and optionally in component (C2) is between 0.2 and 3, preferably between 0.4 and 2.5 and particularly preferably between 0.5 and 2.

Properties of the Compositions According to the Present Invention

The compositions according to the present invention are liquid at room temperature and can be formulated as one-part compositions. By selecting components (A) to (D) and by passivating the isocyanate-containing component (A) the compositions are storage-stable for a certain period of time even at room temperature. The compositions can be processed without limitations as along as the post-storage increase in viscosity is less than 100%. The compositions according to the present invention fulfil this criterion even after 7 days, preferably after 14 days of storage at room temperature.

Moreover, the compositions according to the present invention are fixable by irradiation with actinic radiation allowing the shape and position of the adhesive and the join partners to be precisely adjusted in a joining process.

Compared to other light-fixable compositions such as, for example, cationically polymerizable epoxy resins or amine curing epoxides the compositions according to the present invention also offer the advantage that a high flexibility at low temperatures and a low glass transition temperature can be adjusted. Compared to radically heat-curing compositions based on peroxides the compositions according to the present invention are characterized by their insensitivity towards oxygen inhibition during heat curing, which is especially required in miniaturized bonding.

The advantages of light fixation will be explained in detail by means of the described processing methods.

Processing Methods Using the Compositions According to the Present Invention

The compositions according to the present invention comprising at least components (A) to (D) are characterized by the fact that the composition applied to a substrate can be transferred by irradiation into a so-called B stage state. In this state the composition has sufficient dimensional and contour stability and can thus be processed in downstream processes without melting away.

The composition does not necessarily have to be heat-cured directly after irradiation with actinic radiation. If the composition according to the present invention in the B stage state is kept from environmental influences such as moisture, dirt and temperatures above room temperature, heat curing can be performed even after at least seven days without any problems, optionally after feeding and joining a second substrate to the irradiated composition.

Thus, the compositions according to the present invention allow industrial manufacturing processes to be performed in which the curable composition is applied in advance to a plurality of parts in a batch process by means of dosing methods such as screen printing or stencil printing, and the composition on the parts is transferred by irradiation with actinic radiation into a B stage state in which melting away is excluded. Then, further parts can be fed to the adhesion site and subsequently a final heat-curing step can be performed. Thus, the compositions according to the present invention allow the temporal and spatial separation of an oven process for heat curing from the other manufacturing steps, allowing an increased throughput in charging processes, for example in the electronics industry. Instead of several heat-curing steps a single final oven process can be used.

A respective method of joining, casting or coating of substrates using the compositions according to the present invention comprises the following steps:
(a) dosing the composition onto a first substrate;
(b) irradiating the composition with actinic radiation;
(c) optionally feeding a second substrate to form a substrate composite, bringing the second substrate into contact with the irradiated composition; and
(d) heat-curing the irradiated composition on the substrate and/or in the substrate composite by heating to a temperature of at least 60° C.

A waiting time of at least 7 days can be kept between steps (b) and (c) or (b) and (d).

When performing the above method as a joining method, the fed second substrate can be preferably bonded with the first substrate without a permanent contact pressure during heat curing. Use of the compositions according to the present invention enables a reliable flow of the composition onto the second substrate during heat curing even without additional contact pressure. Due to the previous light fixation, sinking of the second substrate into the composition during subsequent heat curing in step (d) is prevented.

When using the compositions according to the present invention for deep casting preferably radiation-curable compounds (C2) carrying additional isocyanate-reactive groups are used as component (C). They can be additionally incorporated into the polymeric network during heat curing.

According to another preferred embodiment, the processing method in which the compositions according to the present invention are irradiated after feeding of the second substrate is used as the joining method. This embodiment offers the advantage that the parts can be fixed in their position prior to the heat curing step by irradiation with actinic radiation. A respective method for the joining of substrates using the compositions according to the present invention preferably comprises the following steps:
(a) dosing the composition onto a first substrate;
(b) feeding a second substrate to form a substrate composite, bringing the second substrate into contact with the composition;
(c) irradiating the composition with actinic radiation; and
(d) heat-curing the irradiated composition in the substrate composite by heating to a temperature of at least 60° C.

By means of the described method high position fidelity of the joined parts until final curing can be implemented. Thus, conventional fixing aids which cannot be used in practice in miniaturized parts or mean an inacceptable additional effort are not necessary.

A part joined and fixed according to the described method can be safely kept in position even when mounted diagonally. Even in parts which cannot be penetrated by actinic radiation fixation of the fillet welds by actinic radiation can be performed by use of the described method using the compositions according to the present invention.

In the following, the prerequisites and the procedure for the described process steps will be explained.

a) Dosing

The composition according to the present invention can be applied in any desired shape. All common dosing methods such as needle dosing, shower head dosing, jet dosing, screen or stencil printing or pin transfer are suitable.

b) Irradiation with Actinic Radiation

Irradiation performed in the above described methods is typically performed with light of a wavelength matching the selected photoinitiator, in particular with light of a wavelength from 200 to 600 nm, preferably 320 to 480 nm. The use of energy-saving LED lamps emitting light of a wavelength in the range of 365 nm to 405 nm is particularly preferred. Irradiation of the composition results in a crosslinking at the irradiated surface of the composition that is stable enough to ensure dimensional stability of the composition at the high temperatures used for heat curing. A joined part or a substrate composite can be kept in position by irradiating the composition in the area of the fillet weld. Further, the strength of the irradiated light-fixed composition is sufficiently high to bear a second fed part after heat curing and prevent it from sinking into the composition.

The penetration depth of the actinic radiation and thus the thickness of the light-fixated layer can be controlled by the irradiation dose, the amount and type of fillers and additives used and the wavelength used.

c) Heat Curing

Independently of the type and extent of light fixation by irradiation, a heat-curing step has to be performed for completely curing the compositions according to the present invention.

Heat curing is preferably performed at a temperature in a range of about 60 to 200° C., depending on the isocyanate-reactive component (B).

Curing of the compositions according to the present invention by supplying heat is initiated by the solid isocyanate being dissolved or melting at an elevated temperature while breaking the urea shell. To achieve fast and complete crosslinking, the composition is preferably heated to a temperature of at least 80° C., more preferably to at least 100° C. and particularly preferably to at least 130° C.

Energy for heat curing can be provided by means of convection, for example in a convection oven, by heat conduction, for example by means of a heating plate or thermode, or by means of electromagnetic radiation, for example by IR radiation sources, LASER, microwaves or induction.

Application Examples for the Cured Compositions According to the Present Invention Depending on the formulation, the cured compositions can show a very low elastic modulus across a broad temperature range and/or a very low glass transition temperature $T_g$ of −40° C. or less. In this case, they are very flexible even at low temperatures and are suited for industrial applications in which no tensions are desired between individual parts even at low temperatures.

Moreover, in joining applications, larger curable layer thicknesses can be achieved by light fixation. In compositions described in the state of the art, mere heat curing results in sinking or shifting of the parts.

In particular the combination of high flexibility at low temperatures with a high adhesive layer thickness offers very good decoupling of sensible electronic parts from harmful environmental influences such as temperature variations or shocks.

Specific applications in which these properties of the compositions according to the present invention are especially required comprise the manufacture of MEMS (micro-electro-mechanical systems) sensors. Here, the compositions according to the present invention are particularly suited for die attach applications.

Measuring Methods and Definitions Used

Irradiation

For irradiation, the respective compositions were irradiated with a DELOLUX 20/400 LED lamp by DELO Industrie Klebstoffe at a wavelength of 400 nm with an intensity of 200±20 mW/cm$^2$.

Room Temperature

Room temperature is defined as 23° C.±2° C.

Curing

"Crosslinking" or "curing" is defined as a polymerization, addition or condensation reaction beyond the gel point. The gel point is the point at which the storage modulus G' becomes equal to the loss modulus G".

Viscosity

Viscosity was measured using a Physica MCR302 rheometer by Anton Paar having a PP20 standardized measuring cone with a 200 μm gap at 23° C. and determined at a shear rate of 10/second. To assess storage stability at room temperature the viscosity measurement was repeated after 7 or 14 days. Hereinafter, viscosity changes of less than 50% will be assessed as very good (++), viscosity changes of less than 75% as good (+), viscosity changes of less than 100% as sufficient (o), viscosity changes of 100 to 200% as poor (−) and viscosity changes of more than 200% as insufficient (−−).

Determination of the Glass Transition Temperature

A sample of the composition was cast into a specimen mold and cured by bilateral irradiation (60 s each) and heat curing (30 min at 130° C.). The obtained specimen (45×10× 2.2 mm, 25 mm measuring distance) was sized in a Physica MCR301 rheometer by Anton Paar using a tempering chamber (deformation 0.01%, frequency 1 Hz), oscillating across a temperature gradient (−80° C. to +60° C., 2 K/min). The glass transition temperature is defined as the temperature at the maximum loss modulus G".

Flow Test

An adhesive bead was applied on one of the narrow sides of a glass cuboid (20×20×5 mm), and the glass cuboid was joined with the narrow side abutting to the narrow edge of an aluminum sheet (100×25 mm). Then, one specimen was exposed and the other remained unexposed. Both specimens were placed in a device in a convection oven preheated to 130° C. such that the aluminum sheet formed an inclined plane (45°) on whose upper end the glass cuboid was located. After a dwelling time of 30 min, the specimens were removed from the oven and the distance the glass cuboid had moved on the aluminum sheet due to gravity was measured. Values of <2 mm were assessed as excellent (++), values of 2 to 5 mm as good (+), values of 5 to 10 mm as sufficient (o), values of >10 mm as poor (−) and a detachment of the glass cuboid as insufficient (−−).

Sinking Test

Two parallel beads (approx. 3 mm wide, 2 mm high) were applied onto a glass slide at a distance of 6 mm. Then one sample was exposed (5 s), while the other was not. An aluminum cuboid (20×20×5 mm) was applied on it and heat-cured in a convection oven (30 min at 130° C.). After cooling, the remaining distance between the two beads beneath the aluminum cuboid was measured through the glass slide. Distances of 4 mm and more are considered as excellent (++), distances of 3-4 mm as good (+), distances of 1-3 mm as sufficient (o), distances of 0-1 mm as poor (−) and a complete dissolution of the beads under the weight of the aluminum cuboid as insufficient (−−).

Manufacturing Examples

To manufacture the curable compositions according to the present invention, the isocyanate-reactive component was first mixed with the passivation agent. Then the micronized, solid isocyanate was added and the mixture was intimately mixed by means of a vacuum kneader. Then further isocyanate-reactive components, the radiation-curing components, the photoinitiators and all further additives (E) such as catalysts, stabilizers or thixotropic agents were added while light with wavelengths of less than 500 nm was excluded. Solid additives can also be introduced as a pre-solution or suspension in a liquid formulation ingredient.

The entire composition was intimately mixed with a vacuum kneader and filled into opaque cartridges.

To manufacture the curable compositions according to the comparative examples, an analogous method was used.

The components used to manufacture the curable compositions are set out in Table 1 below:

TABLE 1

| Components of the curable compositions | | |
|---|---|---|
| Tradename | Constitution | Manufacturer |
| Thanecure T9 | micronized TDI uretdion | TSE Industries |
| Jeffamin D-400 | polyetheramine | Huntsman Corporation |
| Jeffamin T-5000 | polyetheramine | Huntsman Corporation |

TABLE 1-continued

Components of the curable compositions

| Tradename | Constitution | Manufacturer |
|---|---|---|
| Caradol ET 250-04 | trifunctional polyether polyol | Shell Chemicals |
| Krasol HLBH-P3000 | hydrogenated, hydroxy group-terminated polyolefin, $Mn = 3100$ g/mol | Cray Valley |
| PolyBd R45 HTLO | hydroxy group-terminated polybutadiene | Cray Valley |
| Ethacure 100 | diethyltoluenediamine | Albemarle Corporation |
| Karenz MT-PE 1 | pentaerythritol-tetrakis-(3-mercaptobutylate) | Showa Denko |
| Bisomer TMPTMA | trimethylolpropane trimethacrylate | BASF SE |
| TAICROS | triallyl isocyanurate | Evonik Industries |
| Irgacure TPO-L | ethyl-(2,4,6-trimethylbenzoyl) phenylphosphinate | BASF SE |
| DBTL | dibutyltin dilaurate | Sigma-Aldrich |
| Triethylamin | basic amine | Sigma-Aldrich |
| Pyrogallol | pyrogallol | Sigma-Aldrich |
| Urethanacrylat-1 | bifunctional urethane acrylate; obtainable by reaction of a hydrogenated, hydroxy-terminated polyolefin with diisocyanate and 4-hydroxybutyl acrylate | In-house production |

Curable compositions according to Examples 1 to 4 of the present invention and Comparative Example 5 were manufactured according to the general manufacturing specification described above. The composition of the curable compositions is set out in Table 2 below.

TABLE 2

Composition of the curable compositions

| Example | | 1 | 2 | 3 | 4 | 5 (Comparison) |
|---|---|---|---|---|---|---|
| Solid isocyanate (A) | Thanecure T9 | 26.0 | 35.0 | 13.9 | 10.2 | 11.41 |
| Passivation agent | Jeffamin D-400 | 1.4 | 0.9 | 0.8 | 0.5 | 0.56 |
| Isocyanate-reactive component (B) | Jeffamin T-5000 | 48.4 | 0 | 0 | 0 | 0 |
| | Krasol HLBH-P3000 | 0 | 0 | 0 | 74.7 | 83.52 |
| | Caradol ET 250-04 | 0 | 0 | 0 | 2.6 | 2.91 |
| | Ethacure 100 | 10.7 | 0 | 0 | 0 | 0 |
| | Karenz MT-PE 1 | 0 | 49.4 | 2.7 | 0 | 0 |
| | PolyBd R45 HTLO | 0 | 0 | 40.0 | 0 | 0 |
| Radiation-curing component (C) | Urethanacrylat-1 | 0 | 0 | 0 | 10.4 | 0 |
| | Bisomer TMPTMA | 10 | 0 | 0 | 0 | 0 |
| | TAICROS | 0 | 13.0 | 0 | 0 | 0 |
| | PolyBd R45 HTLO | 0 | 0 | 39.7 | 0 | 0 |
| Photoinitiator (D) | Irgacure TPO-L | 0.5 | 0.5 | 0.5 | 0.5 | 0.5 |
| Additives (E) | DBTL | 0 | 0 | 0.1 | 0.1 | 0.1 |
| | Triethylamine | 0 | 0.1 | 0 | 0 | 0 |
| | Pyrogallol | 0 | 0.1 | 0.3 | 0 | 0 |
| | Thixotropic agent | 3.0 | 1.0 | 2.0 | 1.0 | 1.0 |

Test Results

The test methods described above were performed using the thus manufactured curable compositions to establish dimensional stability during heat curing (application test), light fixation strength (by means of a sinking test) and storage stability. In addition, the glass transition point of the cured compositions according to Examples 1 to 4 was determined. The thus established properties of the cured compositions are set out in Table 3 below.

TABLE 3

Properties of the curable compositions

| Example | 1 | | 2 | | 3 | | 4 | | 5 (Comparison) |
|---|---|---|---|---|---|---|---|---|---|
| Irradiation | yes | no | yes | no | yes | no | yes | no | yes |
| Application test | ++ | -- | ++ | - | ++ | -- | + | -- | -- |

TABLE 3-continued

Properties of the curable compositions

| Example | 1 | | 2 | | 3 | | 4 | | 5 (Comparison) |
|---|---|---|---|---|---|---|---|---|---|
| Sinking test | ++ | -- | ++ | - | ++ | -- | ++ | -- | -- |
| Glass transition temperature [° C.] | −62 | n.d. | +52 | n.d. | −74 | n.d. | −50 | n.d. | n.d. |
| Change in viscosity 7 d RT | ++ | | ++ | | ++ | | ++ | | ++ |
| Change in viscosity 14 d RT | ++ | | + | | ++ | | ++ | | ++ | n.d. = not determined.

The compositions of Examples 1 to 4 were dosed, fixed and tested once with irradiation and once using the method according to the present invention. The application test shows the advantageous properties of the compositions according to the present invention, which after light fixation have excellent dimensional stability even during heat curing and ensure excellent position fidelity of the joined parts. Whenever the possibility of fixation by irradiation with actinic radiation was not utilized the results were poor to insufficient. As the comparative composition according to Example 5 lacks a radiation-curing component (C), its performance in the application test was insufficient in spite of using the method according to the present invention.

In the sinking test, the compositions according to the present invention also show excellent shape fidelity under the weight of the join partner when using light fixation. Without irradiation the results are poor to insufficient. Comparative Example 5 also shows an insufficient result in the sinking test.

In addition, the compositions according to the present invention show good storage stability at room temperature despite the addition of the radiation-curing component (C). It could also be shown that compositions according to the present invention with a very low glass transition temperature of −40° C. or less can be formulated.

The invention claimed is:

1. A method of joining of substrates using a one-part, actinic radiation-fixable and heat-curable composition that is liquid and storage-stable at room temperature, including (A) an at least bifunctional solid isocyanate having a passivated surface and a melting point of at least 40° C., (B) an isocyanate-reactive compound selected from the group of alcohols, amines and thiols, and mixtures thereof, the isocyanate-reactive compound including an aromatic diamine, (C) a radiation-curable compound having at least one radically polymerizable group, and (D) at least one photoinitiator for radical polymerization, the method comprising:
   a) dosing the composition onto a first substrate;
   b) feeding a second substrate to form a substrate composite, with the second substrate brought into contact with the curable composition;
   c) irradiating the composition with actinic radiation; and
   d) heat-curing the irradiated composition in the substrate composite by heating to a temperature of 60 to 200° C.

2. A method of joining, casting and/or coating of substrates using a one-part, actinic radiation-fixable and heat-curable composition that is liquid and storage-stable at room temperature including (A) an at least bifunctional solid isocyanate having a passivated surface and a melting point of at least 40° C., (B) an isocyanate-reactive compound selected from the group of alcohols, amines and thiols, and mixtures thereof, the isocyanate-reactive compound including an aromatic diamine, (C) a radiation-curable compound having at least one radically polymerizable group, and (D) at least one photoinitiator for radical polymerization, the method comprising:
   a) dosing the composition onto a first substrate;
   b) irradiating the composition with actinic radiation;
   c) optionally feeding a second substrate to form a substrate composite, with the second substrate brought into contact with the irradiated composition; and
   d) heat-curing the irradiated composition on the first substrate or in the substrate composite by heating to a temperature of 60 to 200° C.

3. The method according to claim 2, wherein a waiting time of at least 7 days can be kept between steps (b) and (c) or steps (b) and (d).

4. The method according to claim 2, wherein the curable composition is used as an adhesive or sealant for the joining, casting, sealing and/or coating of substrates.

5. The method according to claim 4, wherein the curable composition is used as an adhesive or sealant for the joining, casting, sealing and/or coating of substrates in MEMS parts.

6. A one-part, actinic radiation-fixable and heat-curable composition that is liquid and storage-stable at room temperature, comprising:
   (A) an at least bifunctional solid isocyanate having a passivated surface and a melting point of at least 40° C.;
   (B) an isocyanate-reactive compound selected from the group of alcohols, amines and thiols, and mixtures thereof, the isocyanate-reactive compound comprising an aromatic diamine;
   (C) a radiation-curable compound having at least one radically polymerizable group; and
   (D) at least one photoinitiator for radical polymerization.

7. The composition according to claim 6, wherein the at least bifunctional solid isocyanate (A) is reacted at its surface with a passivation agent selected from the group of polyamines, amidine and/or guanidine compounds, hydrazine, alkyl hydrazines and/or hydrazide compounds.

8. The composition according to claim 6, wherein 0.1 to 25 mol % of the isocyanate groups of component (A) is reacted with the passivation agent.

9. The composition according to claim 6, wherein 0.5 to 15 mol % of the isocyanate groups of component (A) is reacted with the passivation agent.

10. The composition according to claim 6, wherein 1 to 10 mol % of the isocyanate groups of component (A) is reacted with the passivation agent.

11. The composition according to claim 6, wherein the at least bifunctional isocyanate has a mean particle diameter of at most 40 μm.

12. The composition according to claim 6, wherein the at least bifunctional isocyanate has a mean particle diameter of at most 10 μm.

13. The composition according to claim 6, wherein the isocyanate-reactive compound (B) has a mean functionality of 1.4 to 5.

14. The composition according to claim 6, wherein the isocyanate-reactive compound (B) has a mean functionality of 1.7 to 4.

15. The composition according to claim 6, wherein the radiation-curable compound (C) has a mean functionality of 1.2 to 5, relative to the radically polymerizable group.

16. The composition according to claim 6, wherein the radiation-curable compound (C) has a mean functionality of 1.2 to 3, relative to the radically polymerizable group.

17. The composition according to claim 6, wherein the molar ratio of the free, non-passivated isocyanate groups of component (A) to the isocyanate-reactive groups of compound (B) is from 0.4 to 2.5.

18. The composition according to claim 6, wherein the molar ratio of the free, non-passivated isocyanate groups of component (A) to the isocyanate-reactive groups of compound (B) is from 0.5 to 2.

19. The composition according to claim 6, wherein the one-part, actinic radiation-fixable heat-curable composition has a glass transition temperature of less than −20° C.

20. The composition according to claim 6, wherein the radiation-curable compound (C) carries both a radiation-curable group and an isocyanate-reactive group.

* * * * *